Patented Nov. 21, 1939

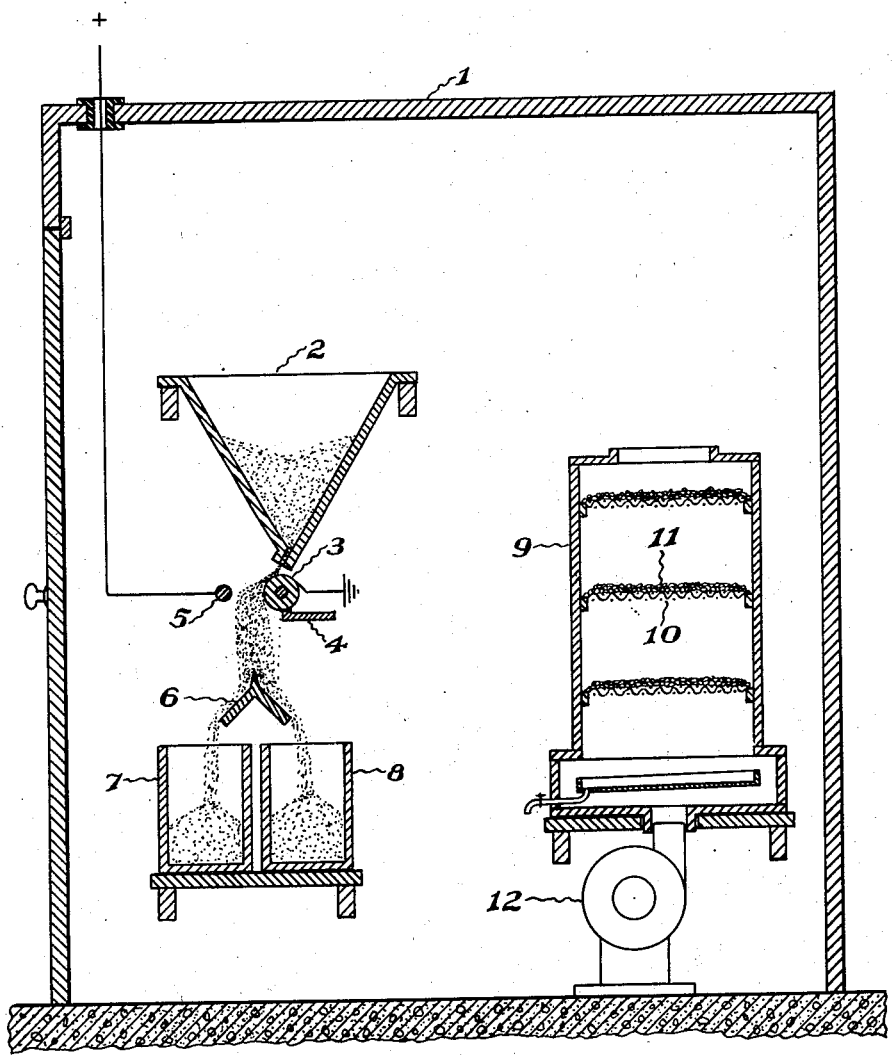

2,180,804

UNITED STATES PATENT OFFICE 2,180,804

PROCESS OF ELECTROSTATIC SEPARATION

Frank A. Fahrenwald, Harvey, Ill., and Norman Frederick Parkinson and George Henry Barnes, Toronto, Ontario, Canada, assignors to International Titanium Limited, Toronto, Ontario, Canada Application August 24, 1936, Serial No. 97,608

3 Claims. (Cl. 209—127)

This invention relates to process for the electrostatic treatment of mixtures containing particles which differ in their ability to receive plus or minus electrical charges, and the object of this invention is to separate and remove from the mass of the material to be treated one or more of the materials mixed therein.

We do not claim any electrostatic process as such, inasmuch as our invention relates to certain improvements in the process.

Our process is applicable to the treatment of any dry, granular or powdery mixtures, but it is particularly useful in the treatment of sands containing mixtures of minerals such as magnetite, ilmenite, silica, rutile and zircon, which exist in large quantities but which have heretofore been of questionable value because of the lack of suitable means for proper separation.

In carrying out the process of electrostatic separation, standard practice is to have the material thoroughly dried and in such finely divided condition that it can be treated while in suspension in the air or while in a freely falling state, and our invention does not affect these well known stages of the treatment. Our particular problem has to do with separation of rutile and zircon from a complex mixture contained in beach sands, and particularly later to effect clean-cut separation between rutile and zircon themselves.

In utilizing the electrostatic process to separate zircon and rutile sands we found that at times the results were good and at times the separation was very incomplete. Our efforts to obtain more uniform results by varying the temperature under which the process was carried out and by adjusting the apparatus were unsuccessful. Finally it was thought that humidity of the air in which the process was carried out might affect the process. A series of experiments were then conducted which showed that when the humidity of the air in which the process was being carried out was high poor results were obtained. We then placed a number of trays of calcium chloride in the separation chamber through which we forced a rapid circulation of air at substantially room temperature. Owing to the moisture absorbing qualities of the calcium chloride we were in this way able to reduce the humidity of the air in the separating chamber, with immediately improved results in the separation process. As a result of further numerous experiments we have found that while successful operations can be carried on in an atmosphere of 40% or less relative humidity and at substantially room temperatures, the best results are obtained when the moisture content is below 34% of saturation, regardless of normal variations of room temperature.

It will be seen from the above that the object of this invention was attained by controlling and maintaining the air at a substantially constant comparatively low humidity, and particularly in maintaining the humidity below 40% and preferably below 34% relative humidity with temperatures approximating that of the room.

Our invention is hereinafter more particularly described and illustrated in the accompanying drawing in which the figure is a diagrammatic view of an electrostatic separator and air dryer as set up for the separation of rutile and zircon.

The separator is set up in a room or other enclosed space the walls of which are indicated by the numeral 1. The separator includes a hopper 2 adapted to receive the particles to be separated. These drop on to a roller 3 which is rotated in the direction indicated by the arrow and which is electrically grounded. A scraper 4 may be provided for scraping off any particles which adhere to the roller. An electrode which consists of a brass or other rod 5 through which passes a direct current of high voltage (in practice about 25,000 volts) is arranged opposite the roller. The electrical charge in the electrode 5 induces an opposite charge in the particles as they pass over the roller. For instance if the electrode 5 is positively charged it will induce a negative charge varying in degree between the different particles of material being treated, with the result that they will behave in a different manner with respect to the electrodes, in that those more highly charged will be more strongly attracted, and therefore in dropping from the roller will be pulled farther away from the roller.

A shed or divider 6 is located below the roller in such a position that it separates the more highly charged and more strongly attracted particles (e. g., rutile) from the less highly charged and less strongly attracted particles (e. g., zircon), the former dropping into a bin or other receptacle 7, and the latter into a bin or other receptacle 8 on the other side of the separator 6.

For further and more complete separation the separated particles may be passed through the same process again, or may be passed through a series of separating units in the same apparatus as is known in the art.

Before passing the mixture of particles through the apparatus they are usually first fully dried by well known methods, as for example, by spreading the mixture on heated trays or by passing through a rotary drier. In separating rutile from zircon sands in accordance with our invention, the material after being dried may be fed into the hopper 2 without cooling from the operating temperature of the drying process usually from 100° to 130° C. Such preliminary drying or heating, however, is standard practice in order to produce a free flowing mixture and does not produce the constant results in treatment caused by our method of treating the air in which the operation is carried out.

It is to be recognized, of course, that the apparatus and method may be simple or elaborate, depending upon the nature of the material to be treated and the amounts of material to be handled. In our present operation of this invention, we use a very simple drying apparatus for removing moisture from the air, which is diagrammatically illustrated in the drawing, in which 9 shows a casing in which is mounted a plurality of screens 10, covered with a layer 11 of calcium chloride or other suitable moisture absorbing material. A blower 12 draws air from the room or space in which the separating operation is being carried on, and forces it through the screens 10, during which the moisture content is removed or suitably reduced, after which the air is passed back into the separation chamber. This provides a simple and inexpensive means for reducing and controlling the humidity of the air. Other means, such as refrigeration, for instance, or even by causing a partial vacuum may be employed.

The separation chamber may be a comparatively small space surrounding the apparatus or may be a comparatively large room in which the operator may work. It need not be air-tight but should be sufficiently so to prevent the ingress of outer air containing more moisture than can be readily removed by the drying apparatus.

In the separation of zircon ($ZrSiO_4$) and rutile ($TiO_2$) from each other and from the sands in which they occur it was found that the best results are obtained when operating in an atmosphere of less than 34% relative humidity although fairly complete separation may be obtained with a humidity of 40%. In actual practice the humidity is maintained at from 30% to 34%. The process is carried out at ordinary room temperature, which is usually from 85° to 95° F. owing to the heat given off by the heated material, although the successful functioning of this invention does not seem to be affected by ordinary variations of the temperature of the atmosphere in which the process is carried out. It is a feature of this invention that it is not necessary to raise or lower the temperature of the atmosphere through which the particles pass, since the process may be carried on at the normal temperature of the room or chamber in which the process is being carried on, it being necessary only to remove excess moisture from the atmosphere through which the particles pass.

It will be seen from the above that we have overcome the objections to previously known processes for electrostatic separation and have achieved the objects of our invention.

What we claim as our invention is:

1. That improvement in the art of electrostatic separation of a mixture of particles of zircon and rutile into its constituent parts which comprises, pre-drying the mixture of zircon and rutile out of contact with the ambient within which the separation takes place, permitting the mixture to fall in unconstrained condition through the electrostatic field of a charged electrode to divert the particles of zircon from the particles of rutile in accordance with their ability to receive electrical charges, isolating the ambient in and surrounding the electrostatic field of the electrode, maintaining the electrode substantially at normal room temperatures, and controlling the moisture content of the isolated ambient to maintain the same below a predetermined maximum by withdrawing moisture from the ambient when the humidity thereof exceeds 40% relative humidity at ordinary room temperatures.

2. That improvement in the art of electrostatic separation of a mixture of particles of zircon and rutile into its constituent parts which comprises, pre-drying the mixture of zircon and rutile out of contact with the ambient within which the separation takes place, permitting the mixture to fall in unconstrained condition through the electrostatic field of a charged electrode to divert the particles of zircon from the particles of rutile in accordance with their ability to receive electrical charges, insulating the ambient in and surrounding the electrostatic field of the electrode from contact with the external atmosphere, maintaining the electrode substantially at normal room temperatures, and controlling the moisture content of the insulated ambient to maintain the same below a predetermined maximum by withdrawing moisture from the insulated ambient when the humidity of the same exceeds 34% relative humidity at normal room temperatures.

3. That improvement in the art of electrostatic separation of the mixture of particles of zircon and rutile into its constituent parts which comprises, pre-drying the mixture of zircon and rutile out of contact with the ambient within which the separation takes place, permitting the mixture to fall in unconstrained condition through the electrostatic field of a charged electrode to divert the particles of zircon from the particles of rutile in accordance with their ability to receive electrical charges, insulating the ambient in the electrostatic field of the electrode from contact with the external atmosphere, maintaining the electrode substantially at normal room temperatures, and circulating the same through moisture absorbing means when the moisture content of the insulated ambient exceeds 34% relatively humidity at normal room temperatures.

FRANK A. FAHRENWALD.
NORMAN F. PARKINSON.
GEORGE H. BARNES.